(12) United States Patent
Krosche et al.

(10) Patent No.: US 7,795,461 B2
(45) Date of Patent: Sep. 14, 2010

(54) SILICON-BORON-CARBON-NITROGEN CERAMICS AND PRECURSOR COMPOUNDS, METHODS FOR THE PRODUCTION AND USE THEREOF

(75) Inventors: Matthias L Krosche, Bonn (DE); Martin Jansen, Leonberg (DE)

(73) Assignee: Max-Planck-Gesellschaft zur Forderung der Wissenschaften e.V., Munich (DE)

( * ) Notice: Subject to any disclaimer, the term of this patent is extended or adjusted under 35 U.S.C. 154(b) by 913 days.

(21) Appl. No.: 10/380,387

(22) PCT Filed: Sep. 14, 2001

(86) PCT No.: PCT/EP01/10669

§ 371 (c)(1), (2), (4) Date: Aug. 18, 2003

(87) PCT Pub. No.: WO02/22522

PCT Pub. Date: Mar. 21, 2002

(65) Prior Publication Data

US 2004/0019230 A1 Jan. 29, 2004

(30) Foreign Application Priority Data

Sep. 14, 2000 (DE) ................. 100 45 428

(51) Int. Cl.
*C07F 7/10* (2006.01)
(52) U.S. Cl. ...................... 556/402; 556/410
(58) Field of Classification Search ............ 556/402, 556/410
See application file for complete search history.

(56) References Cited

U.S. PATENT DOCUMENTS

2005/0119106 A1   6/2005   Jansen et al.

FOREIGN PATENT DOCUMENTS

| DE | 41 07 108 A | 9/1992 |
|---|---|---|
| DE | 198 17 680 A | 10/1999 |
| EP | 0 453 350 A1 | 4/1991 |
| WO | 0 502 399 | 9/1992 |
| WO | WO 98 10118 A | 3/1998 |
| WO | WO 98 45302 | 10/1998 |

OTHER PUBLICATIONS

Chemical Abstract: 1977:601623, "Contributions to the chemistry of boron. LXXXVII. B,Si-functional (silylamino)boranes: a contribution to the SiN-cleavage by boron halides"; Chemische Berichte (1977), 110(8), 2790-801.*

Van Bonn (Chem. Abstract 1988:423120).*

Noth, Heinrich et al., "Decomposition of the Si-N Bond by Lewis-Acidic Boron Compounds," Z. Naturforsch., vol. 16b, No. 9 1961, pp. 618-620.

"Preparation of Chlorodisilazanes and Some of Their Derivatives" authored by Silbiger et al. and published in Inorg. Chem. (1965), 4(9), 1371-72.

Barlos et al., "B,Si-Functional (silylamino)boranes: a contribution to Si-N cleavage by boron halides," Chem. Ber. 110, 2790-2801 (1977) (Abstract and relevant portions translated).

Chemical Abstracts Online, Accession No. 64:104350 & U. Wannagat, G. Schreiner, Monatshefte fur Chemie 1965, 96 (6) 1895-1901.

* cited by examiner

*Primary Examiner*—Elvis O Price
(74) *Attorney, Agent, or Firm*—Sutherland Asbill & Brennan LLP

(57) ABSTRACT

The present invention relates to novel processes for preparing borylsilylamines, novel amines, novel borosilazane compounds, novel oligoborosilazane or polyborosilazane compounds which have the structural feature Si—N—B, ceramic material and methods of producing and using them.

1 Claim, No Drawings

SILICON-BORON-CARBON-NITROGEN CERAMICS AND PRECURSOR COMPOUNDS, METHODS FOR THE PRODUCTION AND USE THEREOF

The present invention relates to novel processes for preparing borylsilylamines, novel borylsilylamines, novel borosilazane compounds, novel oligoborosilazane or polyborosilazane compounds which have the structural feature Si—N—B, ceramic material and methods of producing and using them.

The production of multinary nonoxidic ceramics from molecular precursors is gaining increasing importance. This method makes it possible to obtain materials which were not able to be produced at all by conventional synthetic routes. The main advantages of starting from molecular precursors are the high purity of the end products and the opportunity of obtaining ceramic fibers, since a fusible polymer can be obtained as intermediate. To achieve optimal spinnability, it is critical that the macromolecules of the polymer are very largely linear.

The synthetic route via molecular precursors has been used since 1975 for producing silicon carbide fibers (JP 75 50,223). The synthesis of nitridic ceramics from liquid silazane polymers obtainable from ammonia and dichlorosilane was reported in 1983 (D. Seyferth, G. H. Wiseman, C. Prud'homme, J. Am. Ceram. Soc. 66 (1983) C13). Dehydrohalogenation using methylamine has also been prior art since 1984 (D. Seyferth, G. H. Wiseman, Polym. Prepr. 25 (1984) 10). In this way, dichlorosilane and methylamine can be reacted to give a polymer which is converted on heating into a black ceramic. This method can be applied to numerous other halogen compounds. Ceramics comprising Si, B, N and C which have been produced in this way have particularly interesting properties. The extraordinary high-temperature and oxidation resistance which such a ceramic can display is significantly superior to that of all ceramics produced in other ways.

DE 41 07 108 describes the synthesis of the ceramic $SiBN_3C$ by crosslinking of a single-component precursor and subsequent thermal decomposition. The precursor molecule trichlorosilylaminodichloroborane (TADB, $Cl_3Si$—NH—$BCl_2$) used here is crosslinked by means of methylamine, which firstly results in all five chlorine atoms being replaced by methylamino groups with dehydrohalogenation. Together with the NH function, the structural unit thus has six opportunities of forming bridges to the adjacent structural units in subsequent condensation reactions to form a polymer. A strongly transversely crosslinked polymer is obtained in this way. The procedure of DE 41 07 107 therefore does not give the optimally desired linearity of the polymer and spinning presents problems.

A further disadvantage of the previously used precursor compound TADB is its difficult handling and the limited storage life. It is a highly reactive, aggressive, fuming liquid which on prolonged storage decomposes continually to give off trichloroborane and hydrochloric acid, even at below −20° C.

Attempts have been made to block individual reactive positions in the precursor molecules and thus block individual bridging opportunities. However, the silazane dissociation (analogous to the synthesis of TADB) presents problems. Even the introduction of one methyl group on the nitrogen gives an unusable product mixture whose further fractionation is unsuccessful (K. Barlos, H. Nöth, Chem. Ber. 110 (1977)2790). Despite the lack of success of the synthesis, which our own work has confirmed, the substance was assigned a CAS number [64355-89-1]. There are to the present time no further publications describing this compound.

DE 196 28 448 states that the C:N ratio in the ceramic can be varied by use of crosslinking reagents which go beyond the generally customary substances ammonia and methylamine. However, no spinnable polymers can be obtained in this way. According to DE 43 44 161, the silicon content can be increased by ammonolysis of a mixture of TADB and various chlorosilanes. According to DE 195 30 390, an increase in the boron content can be achieved by treating the polymer with borane compounds. According to DE 196 35 848, aminated TADB can be used for applying ceramic coatings by the CVD method.

Furthermore, it has been shown that a maximally homogeneous element distribution can only be achieved when a polyborosilazane has been prepared from organo-metallic precursor molecules in which silicon and boron are already present (H.-P. Baldus, M. Jansen, Angew. Chem. 109 (1997) 339).

It is therefore an object of the present invention to provide novel organometallic precursor compounds which can be prepared simply and in high yields, lead to polymers having a lower degree of crosslinking and are simpler to handle than precursor compounds known from the prior art. At the same time, a fully homogeneous distribution of the participating elements in the ceramic should be ensured.

A further object of the invention is to provide an improved process for preparing such or similar compounds.

This object is achieved, according to the invention, by a process for preparing compounds of the formula (I),

$$R_xHal_{3-x}Si—NR^1—BR_yHal_{2-y} \quad (I)$$

where Hal are each, independently of one another, Cl, Br or I, R are each, independently of one another, a hydrocarbon radical having from 1 to 20 carbon atoms, preferably from 1 to 10 carbon atoms, or hydrogen, $R^1$ is a hydrocarbon radical having from 1 to 20 carbon atoms, preferably from 1 to 10 carbon atoms, or hydrogen, x is 0, 1 or 2 and y is 0 or 1.

In the process of the invention, the compounds of the formula (I) are prepared by reacting an amine component $R^1NH_2$ successively with a silane component $SiHal_{4-x}R_x$ and a borane component $BHal_{3-y}R_y$ in any order.

In the first step, the silane component is preferably reacted continuously or a little at a time with the amine component in the gas phase, with or without carrier gas. The intermediate formed is in turn preferably reacted further in the second step with the borane component in the condensed phase, in an inert solvent or in the gas phase.

It is also possible for the dehydrohalogenation step to be aided by means of an auxiliary base.

The compound dichloroborylmethyltrichlorosilylamine $Cl_3Si$—$N(CH_3)$—$BCl_2$, inter alia, was able to be prepared for the first time in pure form by this completely new reaction route. Here, tetrachlorosilane and methylamine are firstly reacted in the gas phase. Methyltrichlorosilylamine is formed as intermediate and this is reacted in condensed form or preferably in the gas phase with trichloroborane. Crosslinking by means of an amine gives a polymeric borosilazane which has a low degree of branching and thus a low viscosity. The melting point of this single-component precursor is 10° C. Problem-free processing as a liquid is thus possible at room temperature. On the other hand, the substance is solid on storage (e.g. in a conventional refrigerator) and can be stored without danger and without decomposition for a virtually unlimited period. The favorable melting point is also a great advantage for transport of the substance.

Numerous variations in respect of the reaction times, reaction temperatures and ways of carrying out the reaction are possible. Thus, the boron component can also be introduced first. Other groups apart from methyl groups can be obtained on the nitrogen by means of an analogous reaction route using other amines. The use of trichlorosilane, dichlorosilane or alkylhalosilanes (preferably methylchlorosilanes) in place of tetrachlorosilane or alkylhaloboranes (preferably methylchloroboranes) in place of trichloroborane makes it possible, alternatively or in addition, to block the other bridging positions by alkyl groups or make them unavailable for bridging as SiH or BH functions.

The compounds prepared according to the invention are borylsilylamines which have 0, 1 or 2 hydrocarbon radicals bound to the silicon atom. Such compounds have the structural feature Si—N—B. In the case of x=1 or 2 and/or y=1, these compounds already contain carbon in the basic framework. Such compounds make it possible to produce ceramics which, owing to the increased carbon content and the realization of new structural features, e.g. Si—C or B—C bonds, have improved mechanical strength and thermal stability. Replacement of halogen radicals in the borylsilylamines of the invention by hydrocarbon radicals, both on the Si and on the B, leads not only to the advantageous introduction of carbon but also to a targeted reduction in the number of reactive halogen atoms. In this way, the Theological properties, in particular the viscosity, of the oligomers or polymers formed from the compounds of the invention can be varied or/and set. Advantageous compounds are ones which have two hydrocarbon radicals (x+y=2) or have three hydrocarbon radicals (x+y=3) and still contain two halogen atoms capable of crosslinking, as a result of which multidimensional crosslinking is restricted and essentially linear polymers are obtained.

In the formula I, the radicals R and $R^1$ can each be, independently of one another, a hydrocarbon radical having from 1 to 20 carbon atoms, preferably from 1 to 10 carbon atoms. A hydrocarbon radical is a radical which is made up of the elements carbon and hydrogen. According to the invention, the hydrocarbon radical may be branched or unbranched, saturated or unsaturated. The hydrocarbon radical can also contain aromatic groups which may in turn be substituted by hydrocarbon radicals. Examples of preferred hydrocarbon radicals are unbranched saturated hydrocarbon radicals such as $C_1$-$C_{20}$-alkyl, in particular methyl, ethyl, n-propyl, n-butyl, n-pentyl, n-hexyl, n-heptyl, n-octyl, n-nonyl and n-decyl. However, the radicals R can also be branched saturated hydrocarbons, in particular branched $C_3$-$C_{20}$-alkyls such as i-propyl, i-butyl, t-butyl and further branched alkyl radicals. In a further, preferred embodiment, the radical R comprises one or more olefinically unsaturated groups. Examples of such radicals are vinyl, allyl, butenyl, pentenyl, hexenyl, heptenyl, octenyl, nonenyl, decenyl, butadienyl, pentadienyl, hexadienyl, heptadienyl, octadienyl, nonadienyl and decadienyl. The radical R can also contain an alkyne group, i.e. a C≡C bond. In a further, preferred embodiment, at least one radical R and preferably all radicals R contain(s) an aromatic group, in particular an aromatic group having from 5 to 10 carbon atoms, in particular 5 or 6 carbon atoms, e.g. a phenyl group, or an aromatic group, in particular a phenyl group, substituted by a hydrocarbon, in particular a $C_1$-$C_{10}$-hydrocarbon, for instance methylphenyl, dimethylphenyl, trimethylphenyl, ethylphenyl or propylphenyl. Inclusive of the substituents, the aromatic radical preferably has from 5 to 20 carbon atoms, in particular 10 carbon atoms. The hydrocarbon radicals R and $R^1$ can be varied independently of one another.

Particular preference is given to at least one radical R and/or $R^1$, in particular all radicals R and/or $R^1$, comprising a $C_1$-$C_{20}$-alkyl group, in particular a $C_1$-$C_6$-alkyl group, a phenyl group, a vinyl group or an allyl group or a hydrocarbon radical having from 1 to 3 carbon atoms, in particular methyl, ethyl or propyl, most preferably methyl.

The radical Hal is a halogen atom, in particular Cl, Br or I, with preference being given to at least one radical Hal and preferably all radicals Hal being Cl.

The object of the invention is also achieved by borylsilylamines of the formula (I),

where Hal are each, independently of one another, Cl, Br or I, R are each, independently of one another, a hydrocarbon radical having from 1 to 20 carbon atoms or hydrogen, $R^1$ is a hydrocarbon radical having from 1 to 20 carbon atoms or hydrogen, x is 0, 1 or 2 and y is 0 or 1, with the proviso that the borylsilylamine is not trichlorosilylaminodichloroborane, $Cl_3Si$—NH—$BCl_2$, or chlorodimethylsilylmethylaminodichloroborane, $(CH_3)_2ClSi$—N($CH_3$)—$BCl_2$.

The radicals are preferably as defined above. $R^1$ is preferably a hydrocarbon radical having from 1 to 10 carbon atoms and R and $R^1$ are particularly preferably, independently on each occurrence, $C_1$-$C_6$-alkyl, phenyl, vinyl or allyl. Hal is preferably Cl, very particularly preferably Cl on each occurrence. Examples of preferred compounds are methyldichlorosilylaminodichloroborane, $CH_3Cl_2$—Si—NH—$BCl_2$, dimethylchlorosilylaminodichloroborane, $(CH_3)_2ClSi$—NH—$BCl_2$, i.e. compounds having the structural feature C—Si—N—B. Preferred embodiments of the invention encompass compounds containing the structural element $RHal_2Si$— or $R_2HalSi$—, in which one or two halogen atoms on the silicon are replaced by hydrocarbon radicals. This firstly increases the hydrocarbon content of a ceramic produced from such compounds, and, secondly, such compounds have a reduced number of halogen atoms which are reactive in oligomerization or polymerization.

Preference is also given to compounds containing the structural element —$BHal_2$ or —BHalR.

An advantage of these precursor compounds of the formula (I) is that the degree of crosslinking of the polymers formed from the precursor molecules is reduced by blocking of individual potential bridging positions, e.g. their NH function.

Monomeric, oligomeric or polymeric borosilazane compounds can be prepared from the novel compounds of the formula (I) by reaction with primary or secondary amines. In such borosilazane compounds, all or some of the halogen atoms of the compound of the formula (I) are replaced by amino groups. The invention therefore also provides borosilazane compounds of the formula (II):

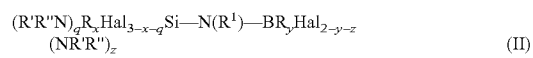

where R', R", R and $R^1$ are each, independently of one another, a hydrocarbon radical having from 1 to 20 carbon atoms, preferably 1-10 carbon atoms, or hydrogen, Hal is Cl, Br or I, q is 0, 1, 2 or 3, x is 0, 1 or 2, y is 0 or 1 and z is 0, 1 or 2 and x+q≦3 and y+z≦2, with the proviso that the borosilazane compound is not tris(dimethylamino)silylaminobis(dimethylamino)borane (($CH_3$)$_2$N)$_3$Si—NH—B(N($CH_3$)$_2$)$_2$.

The preferred meanings of the radicals are as given above. Preference is given to borosilazane compounds of the formula (II) in which the radical $R^1$ is a hydrocarbon having from 1 to 10 carbon atoms. Furthermore, R is preferably not hydrogen.

q is preferably 0, 1 or 2 or/and x is 1 or 2. In the above formula, it is also preferred that q+z≧1, x+q≦3 or/and y+z≦2.

Preference is given to borosilazane compounds of the formula (II) in which all of the halogen atoms are replaced by amino groups. Such compounds have the formula $(R'R''N)_qR_xSi\text{—}N(R^1)\text{—}BR_y(NR'R'')_z$, where q+x=3 and y+z=2.

If one or more halogen atoms are still present in the borosilazane compound, it is preferred that Hal is Cl on at least one occurrence and preferably on each occurrence.

Preference is also given to borosilazane compounds having the formula

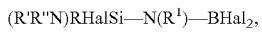
(R'R''N)RHalSi—N(R$^1$)—BHal$_2$,

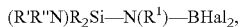
(R'R''N)R$_2$Si—N(R$^1$)—BHal$_2$,

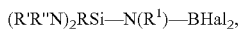
(R'R''N)$_2$RSi—N(R$^1$)—BHal$_2$,

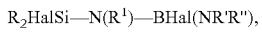
R$_2$HalSi—N(R$^1$)—BHal(NR'R''),

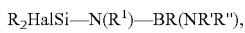
R$_2$HalSi—N(R$^1$)—BR(NR'R''),

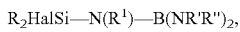
R$_2$HalSi—N(R$^1$)—B(NR'R'')$_2$,

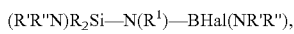
(R'R''N)R$_2$Si—N(R$^1$)—BHal(NR'R''),

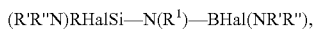
(R'R''N)RHalSi—N(R$^1$)—BHal(NR'R''),

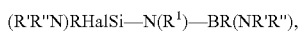
(R'R''N)RHalSi—N(R$^1$)—BR(NR'R''),

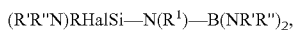
(R'R''N)RHalSi—N(R$^1$)—B(NR'R'')$_2$,

(R'R''N)$_2$RSi—N(R$^1$)—BHal(NR'R''),

(R'R''N)RHalSi—N(R$^1$)—BRHal,

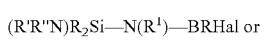
(R'R''N)R$_2$Si—N(R$^1$)—BRHal or

(R'R''N)$_2$RSi—N(R$^1$)—BRHal.

Preference is also given to borosilazane compounds in which all halogen atoms have been replaced by amino groups and which thus bear only hydrocarbon radicals or amino groups. Such compounds have the formula

(R'R''N)R$_2$Si—N(R$^1$)—B(NR'R'')$_2$,

(R'R''N)R$_2$Si—N(R$^1$)—BR(NR'R''),

(R'R''N)$_2$RSi—N(R$^1$)—BR(NR'R'') or

(R'R''N)$_2$RSi—N(R$^1$)—B(NR'R'')$_2$.

In the abovementioned formulae, the radical R has the meanings indicated above for the compound (I), in particular the meanings indicated there as preferred, in each occurrence. R is particularly preferably a hydrocarbon radical having from 1 to 3 carbon atoms, in particular a methyl, ethyl or propyl radical or a phenyl radical or a vinyl radical.

The radicals R' and R'' are each, independently of one another, hydrogen or a hydrocarbon radical having from 1 to 20 carbon atoms, preferably from 1 to 10 carbon atoms. Preference is given to compounds in which at least one of the radicals R' and R'' is a hydrocarbon radical having from 1 to 20 carbon atoms. R' and R'' are particularly preferably selected from among $C_1$-$C_{20}$-alkyl groups, in particular $C_1$-$C_6$-alkyl groups such as methyl, ethyl, propyl, and phenyl, allyl and vinyl groups.

Particular preference is given to compounds in which both R and R' and R'' are methyl on each occurrence.

Such borosilazane compounds can be prepared by reacting a borylsilylamine of the formula (I) with an excess of an amine compound R'R''NH at temperatures of from −90° C. to +300° C., preferably from −50° C. to +200° C. The reaction can be carried out in the gas phase, in condensed form or in a solvent.

Reaction of compounds of the formulae (I) or/and (II) with an amine compound R'R''NH gives oligoborosilazane or polyborosilazane compounds which have the structural feature Si—N—B.

The monomeric or oligomeric units can be converted into polymers by thermal treatment and/or by crosslinking with ammonia or an amine. The invention therefore also provides an oligoborosilazane or polyborosilazane compound which is obtainable by reaction of a compound of the formula (I) or/and a compound of the formula (II) with a compound of the formula (V)

HNR'R''  (V)

or by thermal polymerization of a compound of the formula (I) or of the formula (II). Such oligoborosilazane or polyborosilazane compounds have the structural feature Si—N—B.

Reaction of the monomers with the amines mentioned can be carried out in either open or closed systems. The reaction temperatures are preferably in the range from −78 to +500° C., preferably from −50° C. to +250° C., and the reaction time is from 5 minutes to 20 days.

Amines suitable for the reaction include, for example, methylamine, ethylamine, dimethylamine, aniline and ammonia. The reaction can be carried out either in the pure components or in an aprotic solvent such as hexane, toluene, THF or methylene chloride. The reaction temperature is preferably at least −100° C., more preferably at least −78° C., and preferably not more than 100° C., more preferably not more than 5° C.

The consistency of the polyborosilazanes of the invention ranges from slightly viscous through resinous or wax-like to solid, depending on the radicals R, R', R'', $R^1$ and on the degree of polymerization. Thermal crosslinking occurs by elimination of an amine radical with formation of new Si—N or B—N bonds. Crosslinking by means of ammonia occurs by replacement of an NR'R'' group by an NH$_2$ group which then crosslinks further.

The oligoborosilazanes or polyborosilazanes have, in particular, the structural features C—Si—N—B—N—B—N—Si—C, C—Si—N—B—N—Si—N—B, Si—N—B—N—Si—N—B—C, Si—N—B—N—B—N—Si, Si—N—B—N—Si—N—B or/and B—N—Si—N—Si—N—B. The structural features indicated are, in the interests of clarity, presented as linear sequences in which Si is of course always bound to four adjacent atoms, B and N are always bound to three adjacent atoms and C is bound to either three or four adjacent atoms. The corresponding bonds have been left out in the interests of clarity, but can readily be visualized by a person skilled in the art. Branches can occur on each atom.

B and Si are particularly preferably surrounded by only N or/and C. N and C can be surrounded by any atoms, but N—N bonds are preferably not present.

The desired silicon carboboronitride ceramics can be produced from the polyborosilazanes of the invention. The invention therefore also provides a process for preparing a silicon carboboronitride ceramic, which comprises heating a monomeric, oligomeric or polymeric borosilazane compound as described herein at temperatures in the range from 800° C. to 2000° C., preferably from 800° C. to 1800° C., more preferably from 1000° C. to 1700° C. and most preferably from 1300° C. to 1700° C., in an inert or amine-containing, in particular ammonia-containing, atmosphere. The borosilazanes are converted into a silicon carboboronitride ceramic powder by means of an aminolysis or ammonolysis reaction and subsequent pyrolysis. The ceramic can be obtained in amorphous or at least partially crystalline form in the pyrolysis. It is preferably an amorphous silicon carboboronitride. The ceramic has, in particular, a high thermal stability and is inert toward oxygen. The elements present within the ceramic are distributed therein virtually completely homogeneously. Crystallization of the amorphous material to give a composite ceramic comprising SiC, $Si_3N_4$ or/and BN can be achieved by aging at a temperature of >1700° C. In such a crystalline composite ceramic, SiC, $Si_3N_4$ or/and BN crystallites are preferably essentially fully homogeneously distributed on a nanometer scale.

Si—N—B structural units are preferably present in the ceramic and the elements Si, N, B and, if present, C are preferably present in an amount of more than 90% by weight, more preferably more than 95% by weight. Preference is here given to carbon-containing ceramics. The silicon carboboronitride ceramic of the invention has, in particular, a low oxygen content of preferably <5% by weight, more preferably <2% by weight and most preferably <1% by weight. The process of the invention for preparing a silicon carboboronitride ceramic makes it possible to produce ceramics which are virtually free of oxygen.

The ceramic material preferably comprises the structural units C—Si—N—B or/and Si—N—B—C, particularly preferably the structural units C—Si—N—B—C, in particular the structural units C—Si—N—B—N—B—N—Si—C, C—Si—N—B—N—Si—N—B, Si—N—B—N—Si—N—B—C, Si—N—B—N—B—N—Si, Si—N—B—N—Si—N—B or/and B—N—Si—N—Si—N—B. The structural features indicated are, in the interests of clarity, presented as linear sequences in which Si is of course always bound to four adjacent atoms, B and N are always bound to three adjacent atoms and C is bound to three or four adjacent atoms. The corresponding bonds have been left out in the interests of clarity, but can readily be visualized by a person skilled in the art. Branches can occur on any atom.

B and Si are preferably surrounded by only N or/and C. N and C can be surrounded by any atoms, but N—N bonds are preferably not present.

For the reaction of the borosilazane compounds with ammonia, it is possible to utilize all methods known from the literature for the aminolysis or ammonolysis of tetrachlorosilane, for example reaction with solid or liquid ammonia at low temperatures (U.S. Pat. No. 4,196,178), reaction with gaseous ammonia in an organic solvent (U.S. Pat. No. 3,959,446) or reaction with ammonia in a high-temperature reaction with elimination of hydrogen chloride (U.S. Pat. No. 4,145,224).

In a preferred embodiment, the borylsilylamine of the formula (I) are ammonolyzed by means of ammonia at temperatures in the range from −200° C. to +1400° C. and the intermediate formed is calcined at temperatures in the range from 800° C. to 1400° C. in an inert atmosphere or/and ammonia.

Independently of this specific embodiment, the inert atmosphere can be selected from among noble gas atmospheres, for example an argon or helium atmosphere, a nitrogen atmosphere and atmospheres of other inert gases which do not react with the reactants under the reaction conditions ranging from 800° C. to 1700° C.

Apart from the preferably amorphous or crystalline ceramics obtainable in this way and methods of preparing them, the present invention also provides for the use of the monomeric, oligomeric and polymeric borosilazane compounds and of amorphous and at least partially crystalline ceramic materials for producing ceramic fibers, ceramic coatings, shaped ceramic bodies, ceramic sheets and/or ceramic microstructures.

The polyborosilazanes can be processed either directly or as solutions in organic solvents to produce shaped bodies, fibers, sheets or coatings. The viscosity of the polymers can, according to the invention, be matched to requirements by the choice of the compounds of the formula (I) used and by means of the subsequent thermal treatment.

The shaped polyborosilazanes can be subjected to a pyrolysis and/or a physical or chemical pretreatment, e.g. curing or crosslinking, to make the polymer infusible.

A suitable treatment for producing infusible polyborosilazanes is described, for example, in DE 195 30 390 A1, in which infusible compounds are obtained by reaction with borane-amine adducts.

Microstructures can be produced, for example, by injection molding or by lithographic processes. The ceramics are particularly preferably produced in the form of fibers from which it is possible to manufacture, for example, woven fabrics or braided materials which can be used as fillers for increasing the strength or toughness of other ceramics.

The borosilazane compounds of the invention can also be used in chemical vapor deposition (CVD) or physical vapor deposition (PVD). Coating substrates by means of CVD or PVD makes it possible to produce ceramic coatings or layers. The vapor deposition can be carried out as described in the prior art (cf., for example, DE 196 35 848 C1).

The invention is illustrated below by means of some examples.

EXAMPLE 1

Preparation of Methyltrichlorosilylamine

A 4 l three-necked flask is connected, in each case via a stopcock, to a 250 ml flask and a cold trap. The 4 l three-necked flask is evacuated and 2 ml of tetrachlorosilane (18 mmol) are then added. The 250 ml flask is filled with methylamine (at atmospheric pressure, 14 mmol). As soon as the tetrachlorosilane is completely vaporized, methylamine is allowed to flow into the 4 l flask. After a reaction time of 10-60 s, the product is condensed in the cold trap. The procedure can be repeated as often as desired. The molar amounts can be varied over wide ranges. The reaction product is obtained as a clear liquid mixed with the excess of tetrachlorosilane. This liquid is stable indefinitely at 60° C., but polymerization occurs at room temperature.

$^1$H-NMR ($C_6D_6$): $\delta_{CH}$=2.30 ppm (s); $\delta_{NH}$=1.39 ppm (s); $^{13}$C-NMR ($C_6D_6$): $\delta$=27.2 ppm

EXAMPLE 2

Preparation of Dichloroborylmethyltrichlorosilylamine

The reaction product from example 1 (about 0.1 mol) is diluted at 78° C. with 250 ml of dry n-hexane. 20 g of trichloroborane (0.17 mol) are condensed in. A milky suspension of the initially formed adduct is obtained. The temperature of the reaction mixture is slowly increased until the hexane boils. This results in the solution becoming clear and a granular salt precipitate ($Cl_3SiNH_2Me^+Cl^-$) being formed. The latter is filtered off and the filtrate is fractionally distilled. 12 g (about 0.05 mol) of product are obtained at 58° C. and 11 mbar. The yield is thus quantitative.

NMR ($C_7D_8$; TMS or $BF_3 \cdot OEt_2$); $^1$H: δ=2.68 ppm; $^{13}$C: δ=37.16 ppm; $^{11}$B: δ=42.8 ppm MS (EI): m/e=245 amu ($M^+$); 244 amu ($M-H^+$); 209 amu ($M-HCl^+$) Melting point: 8-14° C.

EXAMPLE 3

Crosslinking of Dichloroborylmethyltrichlorosilylamine with Methylamine 0.5 mol of methylamine are dissolved in 200 ml of dry n-hexane and cooled to 78° C. While stirring, a solution of 6 g of dichloroborylmethyltrichlorosilylamine (25 mmol) and 250 ml of dry n-hexane are added dropwise over a period of 4 hours. After warming, the precipitate of methylammonium chloride is filtered off and the hexane is distilled off under reduced pressure. This gives 4.5 g of a slightly viscous clear liquid. After thermal treatment in the temperature range 100-300° C., about 3 g of solid polymer are finally obtained. Any viscosity in between can be obtained in a targeted manner by means of this treatment.

EXAMPLE 4

Preparation of an SiBCN Ceramic

The polymer from example 3 is heated in a stream of nitrogen at a heating rate of 300 K/h to 1400° C. in a crucible made of hexagonal boron nitride. An amorphous black ceramic powder is obtained.

EXAMPLE 5

Preparation of Chloro(methyl)borylmethyltrichlorosilylamine

The reaction product from example 1 (about 30 mmol) is diluted at -78° C. with 250 ml of dry n-hexane. 3 g of dichloromethylborane (31 mmol) are condensed in. A milky suspension of the initially formed adduct is obtained. The temperature of the reaction mixture is slowly increased, which results in the solution becoming clear and a granular salt precipitate ($Cl_3SiNH_2Me^+Cl^-$) being formed. The latter is filtered off and the filtrate is evaporated, giving 3 g (about 13 mmol) of product.

EXAMPLE 6

Preparation of Dichloroborylmethyldichloro(methyl)-silylamine

A 4 l three-necked flask is connected, in each case via a stopcock, to a 250 ml flask and a cold trap. 100 ml of dry n-hexane and an excess of trichloroborane are placed in the cold trap. 2 ml of trichloromethylsilane (17 mmol) are introduced into the evacuated 4 l three-necked flask. The 250 ml flask is filled with methylamine (at atmospheric pressure, 14 mmol). As soon as the silane has completely vaporized, methylamine is allowed to flow into the 4 l flask. After a reaction time of 10-60 s, the product is condensed in the cold trap. This procedure is repeated 20 times. The temperature of the reaction mixture is slowly increased. This results in the solution becoming clear and a granular salt precipitate ($MeCl_2SiNH_2Me^+Cl^-$) being formed. The latter is filtered off and the filtrate is evaporated. 9 g (about 40 mmol) of product are obtained.

NMR ($CDCl_3$; TMS); $^1$H: δ=30.8 ppm (N—$CH_3$); $^1$H: δ=1.13 ppm (Si—$CH_3$); $^{13}$C: δ=36.5 ppm (N—$CH_3$); $^{13}$C: δ=9.2 ppm (Si—$CH_3$)

MS (EI): m/e=225 amu ($M^+$); m/e=219 amu ($M-H^+$); M7Z=187 amu ($M-HCl^+$); m/e=160 amu ($SiBNCl_3^+$); M7Z=138 amu ($CH_3SiBNCl_2^+$)

Melting point: -38° C.
Boiling point: 50° C. at 0.8 kPa

EXAMPLE 7

Continuous Preparation of Methyltrichlorosilylamine

A reaction flask is connected, in each case via throttle valves, to stock containers for methylamine and tetrachlorosilane. The reaction mixture is continuously pumped off and frozen out in a cold trap. Precise ratios of amounts cannot be given in this reaction procedure, but it has to be ensured that the amine is always present in a deficiency. The process can be maintained until the methylammonium chloride deposits fill too much of the reaction flask.

EXAMPLE 8

Continuous Preparation of the Adduct of Methyltrichlorosilylamine and Trichloroborane Methyltrichlorosilylamine is prepared by allowing methylamine and tetrachlorosilane vaporized at atmospheric pressure to flow together via regulatable throttle valves into a continuously evacuated reaction tube. The molar ratio of methylamine to tetrachlorosilane is measured by means of gas flow meters and adjusted so that it is in the range from 1:0.5 and 1:0.8. The reaction tube is ideally cooled from the outside by means of water. Crystalline methylammonium chloride deposits on the walls of the reaction tube as a hard layer.

Downstream of the reaction tube, trichloroborane flows in continuously in a slight excess via a further throttle valve. The adduct of methyltrichlorosilylamine and trichloroborane is formed in quantitative yield as a colorless precipitate. In a typical experiment, about 700 g of tetrachlorosilane, 100 g of methylamine and 400 g of trichloroborane are reacted over a period of from 5 to 8 hours.

EXAMPLE 9

Synthesis of Dichloroborylmethyltrichlorosilylamine

Variant without Solvent:

100 g of the adduct of methyltrichlorosilylamine and trichloroborane (product from example 8) are heated to 70° C. in an argon atmosphere. Trichloroborane which is formed distills off. This leaves a mixture of dichloroborylmethyltrichlorosilylamine and the salt $Cl_3SiNH_2Me^+Cl^-$. Dichloroborylmethyltrichlorosilylamine can be distilled off from the nonvolatile salt in a high vacuum.

Variant with Solvent:

100 g of the adduct of methyltrichlorosilylamine and trichloroborane (product from example 8) are suspended in 500 ml of dried n-hexane. The suspension is refluxed for 30 minutes. This results in formation of a clear solution and a granular salt precipitate ($Cl_3SiNH_2Me^+Cl^-$) from the milky suspension and trichloroborane which is formed distills off. The salt precipitate is filtered off and the solvent is distilled off to leave 43 g of dichloroborylmethyltrichlorosilylamine. The reaction product has been characterized in example 2.

The invention claimed is:

1. A pure borosilazane compound of the formula (II)

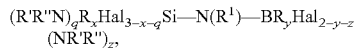

where R', R", R and $R^1$ are each, independently of one another, a hydrocarbon radical, where R', R", R have from 1 to 20 carbon atoms or hydrogen and $R^1$ has from 1 to 3 carbon atoms, Hal is Cl, q is 0, 1, 2 or 3, x is 0 or 1, y is 0 or 1, z is 0, 1 or 2 and x+q<3 and y+z<2, with the proviso that the compound is not tris(dimethylamino)silylaminobis-(dimethylamino)-borane $((CH_3)_2N)_3$—Si—NH—$B(N(CH_3)_2)_2$, and when the compound is $Cl_3Si$—$N(CH_3)$—$BCl_2$, the $Cl_3Si$—$N(CH_3)$—$BCl_2$ is at least 93% pure.

* * * * *

UNITED STATES PATENT AND TRADEMARK OFFICE
CERTIFICATE OF CORRECTION

| | | |
|---|---|---|
| PATENT NO. | : 7,795,461 B2 | Page 1 of 1 |
| APPLICATION NO. | : 10/380387 | |
| DATED | : September 14, 2010 | |
| INVENTOR(S) | : Matthias L. Kroschel and Martin Jansen | |

It is certified that error appears in the above-identified patent and that said Letters Patent is hereby corrected as shown below:

On the title page, (75) Inventors:, delete "Krosche" and insert --Kroschel--.

On the title page, (56) References Cited, delete "WO 0 502 399" and insert --EP 0 502 399.0--.

Signed and Sealed this

Ninth Day of November, 2010

David J. Kappos
*Director of the United States Patent and Trademark Office*